United States Patent [19]

Kägi

[11] Patent Number: 4,934,069
[45] Date of Patent: Jun. 19, 1990

[54] DRYING MACHINE

[75] Inventor: Bruno Kägi, Meilen, Switzerland

[73] Assignee: Walser & Co. AG, Wald, Switzerland

[21] Appl. No.: 269,956

[22] Filed: Nov. 10, 1988

[30] Foreign Application Priority Data

Nov. 18, 1987 [CH] Switzerland .................. 04482/87

[51] Int. Cl.⁵ .............................................. F26B 19/00
[52] U.S. Cl. ..................................... 34/243 R; 34/97
[58] Field of Search ............... 34/243 R, 90, 91, 151, 34/202, 233, 219; 219/370, 371; 119/85

[56] References Cited

U.S. PATENT DOCUMENTS 3,409,996 11/1968 Konstandt ............................ 34/91
3,683,512 8/1972 Beam, Jr. ......................... 34/243 R
3,878,621 4/1975 Duerre ................................ 34/90

Primary Examiner—Henry A. Bennet
Attorney, Agent, or Firm—Herbert Dubno

[57] ABSTRACT

A drying station for large animals, in particular, horses, comprises a blower, which is, essentially, moveable vertically up and down and which is preferably a hot-air blower, disposed in a housing, defining a low-pressure chamber. An adjustable flow guide is disposed in the region of the air outlet thereof. Such a drying station allows the drying of the horse to be carried out without manual work, quickly and thoroughly as well as extremely gently for the animal.

4 Claims, 1 Drawing Sheet

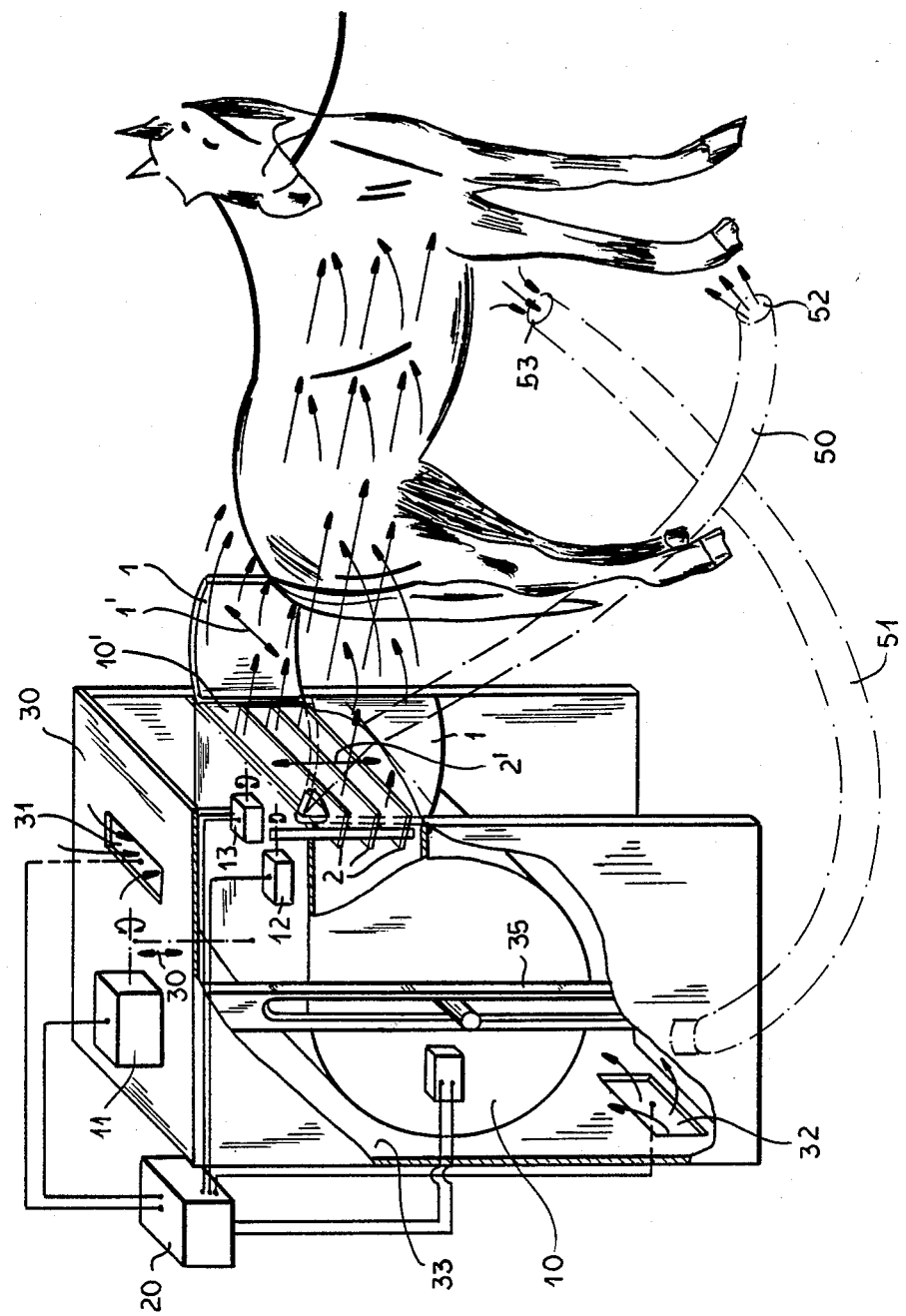

DRYING MACHINE

FIELD OF THE INVENTION

The present invention relates to a drying station for large animals, in particular, horses.

BACKGROUND OF THE INVENTION

As essential part of the care of horses lies in drying the animals, particularly after exercise which has been carried out by theretofore rubbing dry. However, since this is relatively strenuous and time-consuming, the care that is in principle necessary therefor is often not taken.

Attemps to improve and speed up drying by means of a customary hand hair dryer had to be given up quickly, for the highly sensitive animals immediately react most violently (rearing up, kicking out) upon being hit at a certain point by the blast of air from the hair dryer.

OBJECT OF THE INVENTION

It is therefore a primary object of this invention to provide a drying station for horses, with which the animals may be dried most carefully without manual work and in the shortest period of time and without encumbrance caused by a reaction of the animal.

SUMMARY OF THE INVENTION

This is achieved according to the invention by providing a blower, which is movable vertically up and down and which is preferably a hot-air blower, is disposed in a housing, defining a low-pressure chamber and wherein adjustable flow-guiding means are disposed in the region of the air outlet thereof.

As a result of these steps, the horse can now be dried gently, yet, nevertheless, quickly and effectively on all places of its body practically simultaneously by having the oncoming flow directed, from the rear, and the air-stream directed upward and downward as well as oscillating laterally according to the up-and-down movement of the blower, practically enveloping the horse completely.

For this, it is advantageous that the flow-guiding means comprise two lateral, vertically-extending flaps, which are mutually moveable to and fro by servo-control means. The flow-guiding means also comprise horizontally-extending flaps, which are mutually inclinable by servo-control means.

In order to create a dry flow of warm air with least possible power consumption, it is, moreover, of advantage that the housing has as its low-pressure side, at least one upper and at least one lower air-inlet port.

To be able to operate the drying station fully automatically, it is advantageous that at least the blower, the positioning means thereof, as well as said servo-control means of the flow-guiding means are in operative connection with a central control.

BRIEF DESCRIPTION OF THE DRAWING

An embodiment of the present invention will now be more particularly described by way of example with reference to the sole FIGURE of the accompanying drawing in which in perspective view, partly broken away, illustrates diagrammatically a drying station for horses according to the invention.

SPECIFIC DESCRIPTION

The illustrated drying station, shown in operation for drying a horse, comprises a blower 10, being preferably a hot-air blower, which is, moveable vertically up and down in a housing 30 by appropriate means, for example, lateral guide rails 35 and a motor winch 11, as is indicated by the arrow 30'.

The housing 30 defines a low-pressure chamber 33 with, in this case, one upper 31 and one lower air-inlet port 32. The secondary air thus drawn in by the blower 10, leaves the blower 10 in the region of the air outlet 10', in which adjustable flow-guiding means 1 and 2 are disposed.

The flow-guiding means comprise, two lateral, vertically-extending flaps 1, which are mutually moveable to and fro in the direction of the arrow 1', so that drying air is blown against both sides of the horse when it moves sideways somewhat.

Furthermore, the flow-guiding means comprise horizontally-extending fan flaps 2, which are mutually inclinable in the direction of the arrow 2' by servo-control means 12, which, together with the up-and-down movement of the blower 10, allows air to be blown against the animal, irrespective of its size, from its croup to its hooves.

A central control 20 allows a fully-automatic operation of the drying station and is in operative connection with the blower 10 and the motor winch 11 thereof as well as the servo-control means 12 and 13 of the flow-guiding means 1 and 2.

The drying station for horses in particular, meets all the demands of a quick, gentle and effective drying, is practically maintenance-free and may be mounted at practically any place desired.

The previously-described drying station may, of course, be greatly modified within the bounds of the invention. In particular, the air-intake ports 31 and 32 of the low-pressure chamber 33 may, for example, be provided with flap means to regulate the air intake, in which case, these may also be controlled by the central control 20.

Further, hose means 50, 51 are connectable to the outlet side and/or the inlet side of the low-pressure chamber 33, which allow by means of valves 52, 53 a direct blowing and/or sucking by hand, as is indicated in the drawing by dot-dash lines.

What I claim is:

1. A drying station for a horse, comprising:
   housing means defining a low pressure chamber having at least one inlet opening;
   a blower in said chamber drawing air from said chamber and formed with an outlet oriented toward a horse to be dried;
   guide means in said chamber defining a vertical path of movement for said blower relative to said housing and means for vertically displacing said blower along said guide means whereby said outlet is moved up and down relative to the horse;
   a plurality of horizontal flaps in mutually parallel spaced apart relationship mounted at said outlet and tiltable about respective horizontal axes;
   first servo means connected to said flaps for varying the tilt of said flaps about said axes;
   a pair of vertical flaps flanking said horizontal flaps and swingable about respective vertical axes to laterally delimit a flow of air from said blower along said horse;
   second servo means connected to said vertical flaps for displacing same about said vertical axes; and central control means connected to said first and second servo means, said blower and said means for vertically displacing said blower along said guide means for controlling same.

2. The apparatus defined in claim 1, further comprising hose means connected to said outlet for guiding an inward flow of air onto said horse.

3. The apparatus defined in claim 1, further comprising hose means connected to said chamber for applying suction to said horse.

4. The apparatus defined in claim 1 wherein said housing is formed with an upper opening communicating with said chamber and a lower opening communicating with said chamber.

* * * * *